3,203,991
BASIC ETHERS OF BIS-(AMINOPHENYL)-
ALCOHOLS
Benjamin Blank, Trevose, and James F. Kerwin, Broomall,
Pa., assignors to Smith Kline & French Laboratories,
Philadelphia, Pa., a corporation of Pennsylvania
No Drawing. Filed Nov. 29, 1962, Ser. No. 241,054
9 Claims. (Cl. 260—570)

This invention relates to a series of new organic compounds which are aminoarylalkyl ethers. More specifically, this invention relates to tertiary-aminoalkoxy-bis-aminoarylalkane derivatives. The compounds of this invention have been found to have utility as inhibitors of adrenal secretion. Furthermore, they exert antiadrenal activity by a unique mechanism of action with fewer side effects than prior art compounds.

Examplary of the compounds of this invention are those having the basic structural formula:

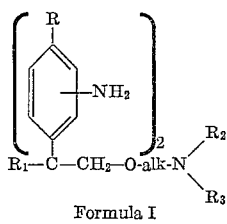

Formula I in which:
R is lower alkyl, such as ethyl or preferably, methyl;
$R_1$ is lower alkyl of from 1 to 5 carbon atoms;
$R_2$ and $R_3$ are lower alkyl of from 1 to 5 carbon atoms or, when taken together with the nitrogen atoms, a cyclic tertiary amine end group such as pyrrolidinyl, piperidinyl, lower alkyl piperazinyl, morpholinyl or thiomorpholinyl; and
Alk is an alkylene moiety of from 2 to 5 carbon atoms separating the O and N atoms by at least 2 carbon atoms.

The bases having the structural formulae noted above may also be used in the form of their nontoxic salts formed by reacting the bases with either a pharmaceutically acceptable organic or inorganic acid, such as hydrochloric, hydrobromic, maleic, pamoic, ethanedisulfonic, sulfuric, phosphoric, sulfamic, etc., acids or active quaternary forming compounds, such as lower alkyl bromides, iodides or chlorides, ethylene chlorohydrin, methyl sulfate and benzyl halides. These equivalent salts are prepared by methods well-known to the art. Preferably the hydrochloride or sulfate salt is used. It will be recognized that up to three molar equivalents of acid per mole of base may be optionally used.

The compounds of this invention are prepared from known $\alpha,\alpha$-diarylalkanoic acids. These acids are either known per se or are prepared by methods similar to those described in Chem. Ber., 14; 1595 (1881). The diarylalkanoic acids are reduced, usually using lithium aluminum hydride in tetrahydrofuran, to the new intermediate 2,2-diarylalkanols (II) which are condensed with an active aminoalkyl halide in the presence of an acid binding agent, such as sodium hydride, to give novel 2,2-diarylalkyl aminoalkyl ethers (III). These intermediates are nitrated to give the nitroaryl intermediates (IV) which are then reduced, usually catalytically, to the desired compounds of Formula I. This synthetic scheme is reproduced hereafter.

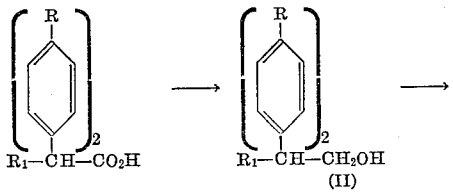

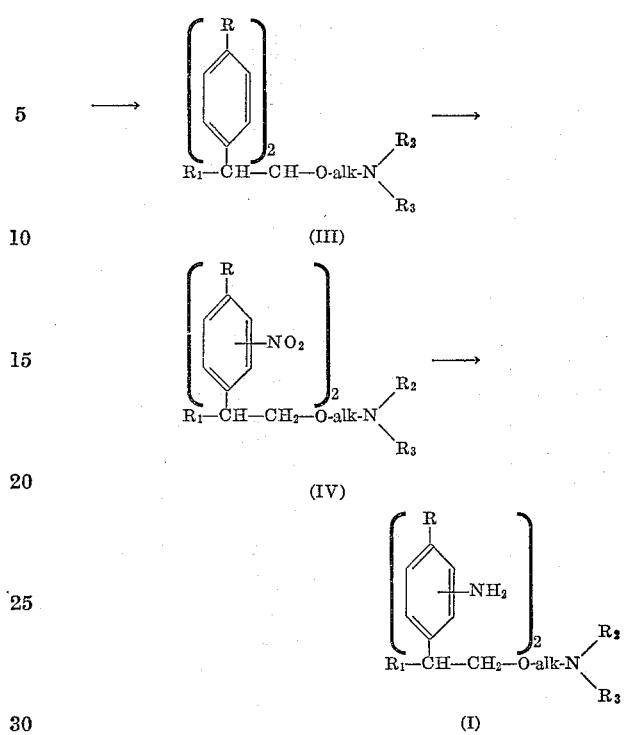

In the nitration step III→IV, a mixture of position isomers is obtained which may be used as such or separated to the individual isomers as desired.

It will be apparent to one skilled in the art that many obvious variations of this invention can be prepared. Exemplary of such variations are replacing the alkyl substituent on the phenyl rings by other groups, such as halo, trifluoromethyl and methoxy, replacing the alkylene chains with other chains, such as substituted or unsaturated chains, varying the position of the phenyl substituents, replacing the tertiary amino end group by primary or secondary amines or forming functional derivatives of the aromatic amino groups, such as N-acyl or N-alkyl derivatives. Such obvious variations are considered within the ambit of this invention. This invention is based on compounds characterized by having symmetrically unsubstituted basic bisaminophenylalkyl moieties connected with aminoalkyl moieties by an ether link. The practice of this invention is taught fully by the following examples.

*Example 1*

A solution of 24.9 g. (0.098 mole, J. Chem. Soc., 1952, 2806) of 2,2-bis-(p-tolyl)-propionic acid in 250 ml. of tetrahydrofuran is added dropwise to 4.2 g. (0.18 mole) of lithium aluminum hydride in 180 ml. of tetrahydrofuran. After heating at reflux for one hour, the reaction material is carefully quenched with 13 ml. of water. The filtrate from the reaction mixture is concentrated under reduced pressure to leave a colorless syrup of 2,2-bis(p-tolyl)propanol. The melting point of the 3,5-dinitrobenzoate derivative is 116–117° C.

A stirred suspension of 46 g. (0.19 mole) of the propanol, 11.3 g. (0.25 mole) of a 53% dispersion of sodium hydride in mineral oil in 700 ml. of dry benzene is heated under reflux for six hours. A solution of 26 g. (0.192 mole) of β-diethylaminoethyl chloride in 100 ml. of benzene is added followed by a reflux period of 18 hours. The cooled mixture is diluted with water. The organic layer is removed, salted out, washed, dried and evaporated. The basic residue is taken into ether and reacted with dry hydrogen chloride gas to give the hydrochloride salt of 1-β-diethylaminoethoxy-2,2-bis(p-tolyl)-propane, M.P. 115–117° C. (dec.).

The ether hydrochloride (11.4 g., 0.03 mole) is added to a mixture of 15 ml. of red fuming nitric acid and 8 ml. of 70% nitric acid below 5° C. after stirring briefly the nitration mixture is poured onto ice-water. The aqueous mixture is extracted with ethyl acetate. The organic extracts are washed and extracted with several portions of dilute hydrochloric acid. After washing with ethyl acetate, the acid extracts are neutralized with aqueous ammonia and taken into ethyl acetate. The organic extracts are washed, dried and evaporated. The red oily residue is taken into benzene and passed over an alumina column which was developed in turn by benzene, 1:1-benzene chloroform, 1:3-benzene chloroform, chloroform and 1:1 chloroform-ethyl acetate. The 1:1-benzene chloroform fraction gave a yellow oil, 1-β-diethylamino-ethoxy-2,2-bis(x-nitro-4-tolyl)-propane.

A solution of 4.7 g. (0.01 mole) of the nitro compound in 200 ml. of absolute ethanol is hydrogenated under three atmospheres of hydrogen in the presence of 1 g. of 10% palladium-on-carbon. The reaction filtrate is evaporated. The basic residue is taken up in ethyl acetate and converted to the trihydrochloride salt with dry hydrogen chloride gas. The hygroscopic salt is recrystallized from butanol-ethyl acetate to give the desired 1-β-diethylaminoethoxy - 2,2-bis(x-amino-4-tolyl)propane trihydrochloride sesquihydrate, M.P. 190° C.

The basic residue (500 mg. containing aliquot in ethyl acetate) with an excess of methyl iodide forms the methiodide salt. Another aliquot (500 mg.) is reacted with an excess of maleic acid to form the maleate salt.

The above reaction is repated using β-dimethylamino-ethyl chloride as an alkylating agent to give successively 1-β-dimethylaminoethoxy - 2,2 - bis(p-tolyl)propane, 1-β-dimethylaminoethoxy - 2,2 - bis(x-nitro-4-tolyl)-propane and 1-β-dimethylaminoethoxy - 2,2 - bis(x-amino-4-tolyl) propane and its salts.

*Example 2*

A solution of 12.5 g. of 2,2-bis(p-ethylphenyl)propionic acid in 225 ml. of tetrahydrofuran with 2.1 g. of lithium aluminum hydride is reacted at reflux, quenched and worked up to give 2,2-bis(p-ethylphenyl)propanol. This compound (2.4 g.) is condensed with an excess of ω-diethylaminobutyl chloride in 500 ml. of benzene with sodium hydride at reflux to give 1-ω-diethylaminobutoxy-2,2-bis(p-ethylphenyl)propane. This syrup (1.8 g.) is nitrated with the fuming nitric acid mixture to give 1-ω-diethylaminobutoxy - 2,2 - bis(p-ethyl-x-nitrophenyl)propane which is catalytically reduced with Raney nickel in alcohol to give the desired 1-ω-diethylaminobutoxy-2,2-bis(p-ethyl-x-aminophenyl)propane as a syrup. In solution in ethyl acetate the base with an excess of sulfuric acid gives the sulfate salt.

*Example 3*

A solution of 15 g. of 2,2-bis(3-tolyl)hexanoic acid, prepared as by Mndzhoyan et al., Doklady Akad. Nauk Armyan, S.S.R. 29, 187 (1959), in tetrahydrofuran is reduced using an excess of lithium aluminum hydride to the 2,2-bis(3-tolyl)hexanol. The alcohol (11.2 g.) is condensed with dimethylaminoisopropyl chloride to give 1-β-dimethylaminopropoxy-2,2-bis(3-tolyl)hexane which is nitrated and reduced to give 1-β-dimethylaminopropoxy-2,2-bis(x-amino-3-tolyl)hexane.

*Example 4*

Substituting in molar equivalents N-pyrrolidinylethyl chloride for β-diethylaminoethyl chloride in Example 1 gives 1 - β - N-pyrrolidinylethoxy-2,2-bis(x-nitro-4-tolyl)-propane and 1 - β-pyrrolidinylethoxy-2,2-bis(x-amino-4-tolyl)propane together with its salts.

Substituting N-piperidinylpropyl chloride gives 1-ω-N-piperidinylpropoxy - 2,2 - bis(x-amino - 4 - tolyl)propane. Substituting N-methylpiperazinylethyl chloride gives 1-β-

N - methylpiperazinylethoxy-2,2-bis(x-amino-4-tolyl)propane together with its salts. Substituting N-morpholinylethyl bromide gives 1-β-N-morpholinylethoxy-2,2-bis(x-amino-4-tolyl)propane and its salts.

What is claimed is:

1. A compound selected from the group consisting of bases, their nontoxic pharmaceutically acceptable acid addition and quaternary ammonium salts, said bases being of the structure:

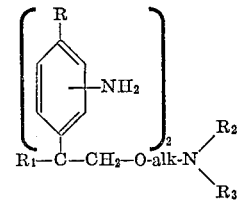

in which:

R is a member selected from the group consisting of methyl and ethyl;

$R_1$ is a lower alkyl of 1–5 carbon atoms;

$R_2$ and $R_3$ are members selected from the group consisting of lower alkyl of 1–5 carbon atoms and, when taken together with the nitrogen atom to which they are attached, pyrrolidinyl, piperidinyl, morpholinyl, N-lower alkylpiperazinyl and thiomorpholinyl; and Alk is an alkylene chain of from 2–5 carbon atoms.

2. A compound of the structure:

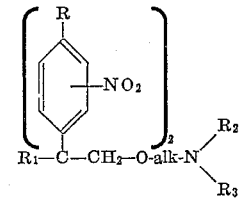

in which:

R is a member selected from the group consisting of methyl and ethyl;

$R_1$ is a lower alkyl of 1–5 carbon atoms;

$R_2$ and $R_3$ are members selected from the group consisting of lower alkyl of 1–5 carbon atoms and when taken together with the nitrogen atom to which they are attached, pyrrolidinyl, piperidinyl, morpholinyl, N-lower alkylpiperazinyl and thiomorpholinyl; and Alk is an alkylene chain of from 2–5 carbon atoms.

3. Nontoxic pharmaceutically acceptable acid addition salts of:

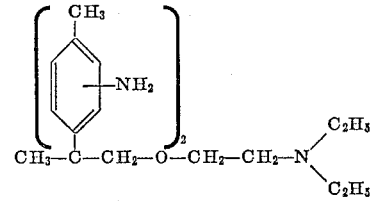

4. The trihydrochloride salts of:

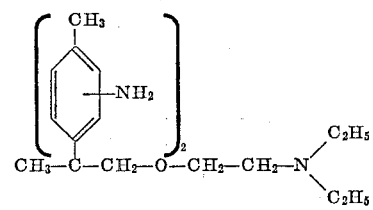

5.
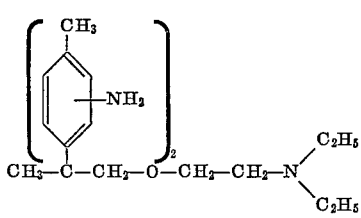
6. Nontoxic pharmaceutically acceptable acid addition salts:
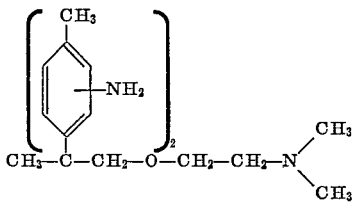
7.
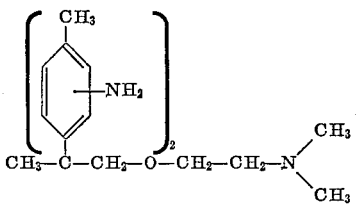
8.
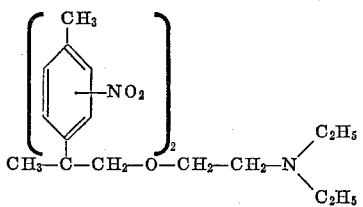
9.
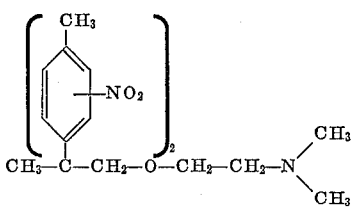
References Cited by the Examiner
UNITED STATES PATENTS
| | | | |
|---|---|---|---|
| 2,949,485 | 8/60 | Oroshnik et al. | 260—570 |
| 3,028,428 | 4/62 | Van der Stelt | 260—570 |
| 3,102,146 | 8/63 | Korman | 260—570 XR |
| 3,121,076 | 2/64 | Keller et al. | 260—570 XR |
OTHER REFERENCES
Burger: "Medicinal Chemistry," 2nd ed., page 75 (1960).
Mndzhoyan et al.: "Chemical Abstracts," vol. 54, page 13032 (1960).
CHARLES B. PARKER, *Primary Examiner.*